Nov. 29, 1955  E. F. AHLSTROM  2,725,160
PELLET FEEDING MECHANISM FOR COFFEE MAKING MACHINES
Filed April 9, 1951                    2 Sheets-Sheet 1
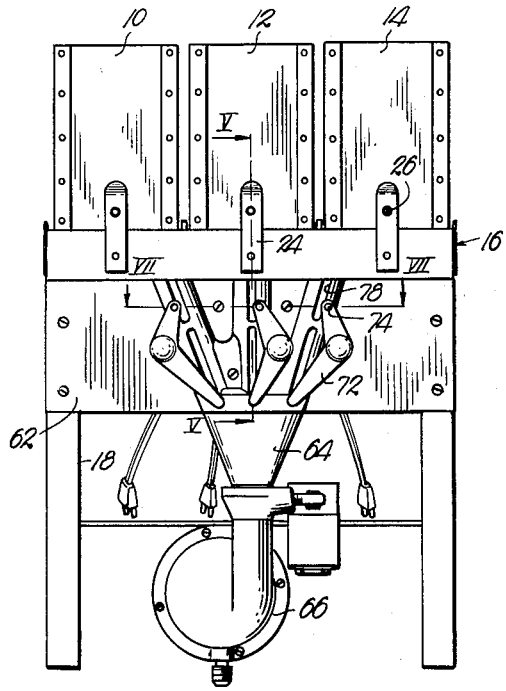
Fig. 1.
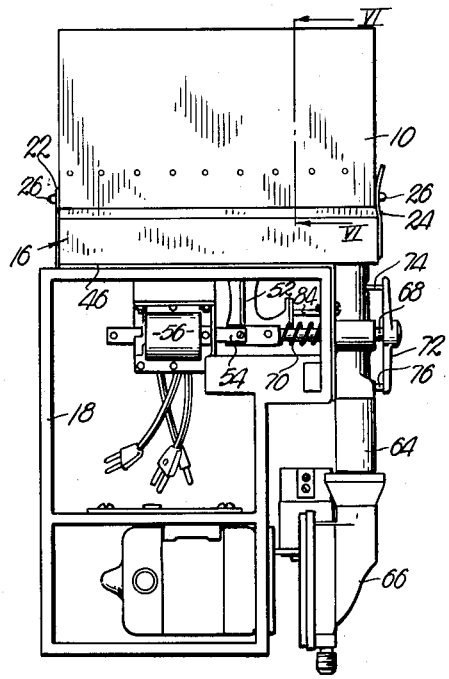
Fig. 2.
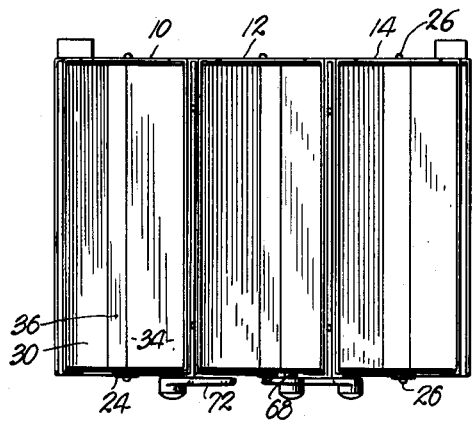
Fig. 3.
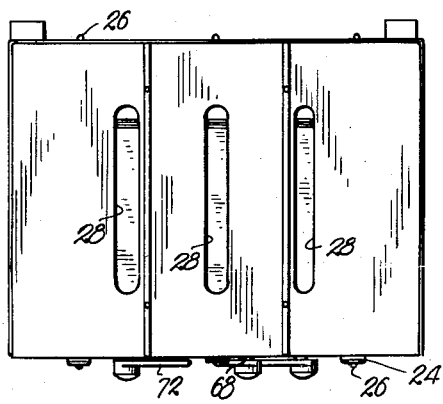
Fig. 4.
INVENTOR.
Edward F. Ahlstrom
BY 
ATTORNEY.

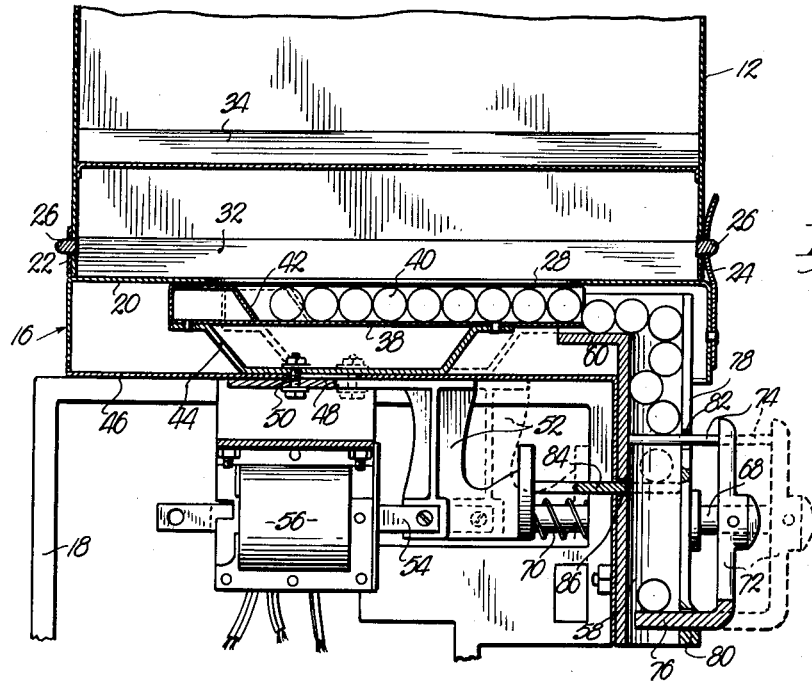

United States Patent Office 2,725,160
Patented Nov. 29, 1955

2,725,160

PELLET FEEDING MECHANISM FOR COFFEE MAKING MACHINES

Edward F. Ahlstrom, Kansas City, Mo., assignor to Chef-Way, Inc., Kansas City, Mo., a corporation of Missouri Application April 9, 1951, Serial No. 220,006

4 Claims. (Cl. 221—178)

This invention has to do with apparatus for dispensing pellets singly from a stored supply thereof, and while the same is particularly adapted for use in hot drink-making machines such as coffee, wherein cream, sugar and coffee pellets are utilized, it will hereinafter become apparent that the same may well have varied and sundry uses.

It is the most important object of the present invention to provide a pellet dispenser that is characterized by the manner in which it handles the pellets gently and without damage thereto, irrespective of the fragility of the pellets, through employment of a reciprocating pin structure movable into and out of the normal path of travel of the pellets from a container therefor, to a point of crushing or other use.

Another important object of this invention is to provide in a pellet dispenser a number of superimposed, spaced pins that are adapted to reciprocate into and out of a tube that receives the pellets in stacked relationship, two of the pins being adapted during reciprocation to release the lowermost of the stack of pellets and the third pin being arranged for disposition to receive the released pellet and to discharge a pellet previously released during each cycle of operation of the dispenser.

Another object of this invention is to provide a pellet dispenser utilizing the principle of three reciprocating pins, two of which alternately support a stack of pellets to be dispensed and a third of which receives a released pellet and additionally releases a pellet previously dispensed, all for the purpose of preventing damage to the pellets, presenting a reliable and positively acting releasing assembly, preventing gouging of the stack of pellets and eliminating malfunction because of the weight of the stack of pellets resting upon certain parts of the dispenser.

A still further object of this invention is to provide in a pellet dispenser, means for positively and effectively feeding the pellets from a container therefor into the aforesaid tube and taking the form of a reciprocable trough that underlies the outlet opening of the container.

Other objects of this invention include the formation of the trough just mentioned so as to prevent bridging and jamming; the way in which the container itself is partitioned to cooperate with the agitating action of the feeding trough in providing free flow of the pellets; the way in which the reciprocable trough and the plurality of reciprocable pins are all actuated through a common prime mover; the manner of separating the lowermost pellet of the stack thereof for discharge without damage to any of the pellets; the manner of preventing clogging by broken or mutilated pellets that reach the outlet tube of the device; and many more minor objects all of which will be made clear as the following specification progresses.

In the drawings:

Figure 1 is a front elevational view of pellet feeding mechanism for coffee making machines made pursuant to the present invention.

Fig. 2 is a side elevational view thereof.

Fig. 3 is a top plan view.

Fig. 4 is a top plan view with the pellet containers removed.

Fig. 5 is an enlarged, fragmentary, cross-sectional view taken on line V—V of Fig. 1.

Fig. 6 is a detailed, cross-sectional view taken on line VI—VI of Fig. 2; and

Fig. 7 is an enlarged, detailed, fragmentary, cross-sectional view taken on line VII—VII of Fig. 1.

Inasmuch as the pellet dispenser hereof is adapted for use in a coffee making machine, there is illustrated in the drawings three containers 10, 12 and 14 adapted by way of example, to receive coffee, sugar and cream pellets respectively. The containers 10—12—14 are supported by a hollow body 16 that is in turn supported by framework 18, there being a horizontal wall 20 forming a part of the body 16 upon which the said containers rest.

A pair of opposed, upstanding, perforated fingers 22 and 24 is provided for each container 10—12—14 respectively for receiving corresponding ears 26 on the containers to hold the same in place on the wall 20. The fingers 22 and 24 are made from resilient material to the end that the same may be pulled outwardly to release the containers. Each container 10—12—14 is provided with an elongated outlet opening 28, it being noted in Fig. 4 of the drawings that the openings 28 for the containers 10 and 14 are adjacent container 12 and that the outlet opening 28 for container 12, is centrally disposed. Pellets within the center container 12 are directed to its outlet opening 28 by means of a pair of oppositely inclined, longitudinally extending shelves 30 and 32 in the manner shown in Fig. 6 of the drawings, and an additional shelf 34 also extending longitudinally of the container 12 is superimposed above the shelf 32.

Shelf 34 has a strip 36 at its lowermost edge that is inclined on an angle differing from the angularity of the main portion of shelf 34. Shelves 30 and 34 are also provided for in the containers 10 and 14 but because of the disposition of the outlet openings 28 of these two containers, the necessity of shelf 32 is not present.

The shape, size, disposition and angularity of the aforesaid shelves are highly important to proper feeding of the pellets to the outlet openings 28 and when so arranged, the tendency to bridge and otherwise become wedged to prevent free flow, is virtually eliminated.

Each container 10—12—14 respectively is provided with a pellet dispensing assembly and since the three assemblies are virtually identical, only one need be described. Such assembly includes an open top, reciprocable trough 38 underlying the corresponding outlet 28 in the manner illustrated in Figs. 5 and 6 of the drawings, the width and depth of the trough being such as to loosely receive pellets 40 as shown in Fig. 5. The length of the trough 38 is substantially the same as the length of the outlet opening 28 and one end of trough 38 is open while the opposite end is provided with an inclined wall 42. It is noted that wall 42 angles downwardly and forwardly toward the open end of the trough 38. Trough 38 is supported by a bracket 44 that slides along a bottom wall 46 forming a part of the body 16. A slot 48 is formed in wall 46 to accommodate a bolt 50 that joins the bracket 44 to a casting 52 that is in turn secured to a reciprocable core 54 forming a part of a solenoid or electromagnet 56.

An elongated, vertical tube 58 having a horizontal branch 60 for receiving the open end of trough 38, is provided with a lowermost end and is mounted upon a panel 62 that forms a part of body 16 and depends from wall 46 thereof. It is noted in Figs. 1 and 7 that the three tubes 58 are preferably cast as a composite unit, but such construction is not essential to the broad principles of operation hereof. In any event, the three downwardly extending tubes 58 all empty into a common hopper 64 that in turn delivers the dispensed pellets to a pulverizer 66.

An elongated, horizontal rod 68 is secured directly to the casting 52 for reciprocation therewith, and a spring 70 coiled about the rod 68 between framework 18 and the casting 52, yieldably holds the entire reciprocating assembly biased in the normal position illustrated in full lines by Fig. 5. A cross-head 72 is mounted on the outermost end of the rod 68 and as is shown in Fig. 1 of the drawings, the three cross-heads are all substantially L-shaped. Cross-head 72 carries an uppermost pin 74 and a lowermost pin 76 that extend through a slot 78 and an opening 80 respectively formed in the tube 58. While the lower pin 76 substantially intersects the longitudinal axis of the tube 58, the upper pin 74 is offset slightly as shown in Fig. 7 and is received by a notch 82 that registers with slot 78. When the pins 74 and 76 are in the normal position extending into the tube 58, a third or median pin 84 that is secured directly to the casting 52, is without the tube 58. Clearance openings 86 are provided in panel 62 and tube 58 respectively for the median pin 84. Pin 84, like pin 76, intersects the longitudinal axis of the tube 58 when extended thereinto in the manner illustrated by dotted lines in Fig. 5. It is thus seen that reciprocation is imparted to all three pins 74, 76 and 84, as well as to the trough 38 each time the solenoid 56 is energized and deenergized.

Assuming container 12 to be filled with pellets 40, it is seen that the same will gravitate into the trough 38 as shown in Fig. 5 of the drawings, when the trough 38 is in the full-line position illustrated. As soon as that part of tube 58 above pin 74 becomes filled with a stack of pellets 40, the lowermost pellet of the stack will be fed to the pin 84 as soon as solenoid 56 is energized to move the cross-head 72 outwardly to the dotted-line position shown in Fig. 5.

It is obvious that as soon as pin 74 clears the tube 58, the stack of pellets 40 will move downwardly and since the pin 84 is extended into tube 58, the stack will be momentarily supported by the pin 84. As soon as the solenoid 56 is deenergized, the pin 74 will return to its normal position within the tube 58 and by virtue of its offset relationship with respect to the longitudinal axis of tube 58, the two lowermost pellets 40 of the stack thereof, will be separated without damage thereto. By the time that pin 74 reaches the inner end of its path of travel as shown in full lines in Fig. 5, the pin 84 will have moved to its fully retracted position and the pellet which it received, will gravitate to the pin 76 which has in the meantime also returned to the full-line position of Fig. 5.

The next cycle of operation, as just above described, effects delivery of the pellet on pin 76 to the hopper 64 as soon as the pin 76 moves to the dotted-line position shown in Fig. 5. Accordingly, during each operation, a pellet is released from the pin 76, the stack of pellets 40 above pin 74 gravitate to a resting position on the pin 84 and the lowermost pellet 40 of the stack thereof, is released for gravitational movement to the pin 76.

It is obvious additionally, that during each operation of solenoid 56, trough 38 operates to agitate the pellets 40 within the overlying container 10—12—14, as the case may be, causing such pellets to move freely through the outlet openings 28 and into the trough 38. Note that by virtue of the inclined end wall 42 of trough 38, no jamming will occur along the horizontal row of pellets 40 within trough 38 even though all of the space above pin 74 becomes filled with such pellets 40. The wall 42 slides beneath the proximal pellets when any retardation of free movement of the pellets 40 takes place.

Thus, the trough 38 effectively delivers the pellets 40 from the overlying container to the tube 58 as it reciprocates along the horizontal portion 60 thereof.

The advantages emanating from the three pin system herein employed now become apparent. Reliable operation without jamming or clogging takes place over a long period of use, and the pellets are handled in a gentle manner without chipping or causing the same to powder. When the pin 76 is retracted to release a pellet thereon, there is no weight whatsoever overlying such pellet to adversely effect its free movement to the hopper 64. The rectilinear path of travel of the pins 74, 76 and 84 add to the advantages and no gouging takes place by virtue of the additional factor relative to the offset disposition of separating pin 74. The pin construction permits passage of fragments of the pellets that may be delivered to the tube 58 by trough 38 and the customer is always assured of receiving substantially a full pellet during each cycle of operation. It is understood further that the three solenoids 56 may be operated singly or simultaneously according to the design of the machine with which the same is used.

It is contemplated that such machine will provide selective features making it possible to receive black coffee, coffee with cream, coffee with sugar or coffee with both cream and sugar, in which event, all three solenoids will be energized upon deposit of a suitable coin or coins and actuating of designated manual controls.

Other advantages may well arise through use of the dispenser hereof and accordingly, those that come within the spirit of the invention as defined by the scope of the appended claims, are manifestly contemplated hereby.

Having thus described the invention what is claimed as new and desired to be secured by Letters Patent is:

1. In a dispenser for frangible pellets, a pellet container having a bottom wall provided with an elongated outlet opening; a frame supporting the container therebeneath; an elongated open top trough beneath the container in alignment with said outlet opening and having an open end; an inclined wall closing the opposite end of the trough; an upright tube mounted on the frame beneath the container and having an open top, horizontal branch at its uppermost end, the open end of the trough extending into the branch; means mounting the trough on the frame for longitudinal reciprocation toward and away from the tube to advance pellets from the container through said opening and into the tube; control mechanism including a plurality of spaced, superimposed pins reciprocable horizontally into and out of said tube and each adapted to retard movement of pellets through the tube when extended thereinto, there being an upper and a lower pin normally within the tube and a median pin normally disposed outside the tube, the upper pin and the median pin being disposed to release the lowermost pellet in the tube for movement to the lower pin as the pins are reciprocated to and from their said respective normal positions, the upper pin being offset relative to the median and lower pins and the axis of the tube, and structure supporting the pins; means reciprocably securing said structure to the frame; and a prime mover carried by the frame and operably coupled with the trough and said structure for reciprocating the same simultaneously.

2. In a dispenser as set forth in claim 1 wherein the path of travel of said lower and said median pins is within a vertical plane through the longitudinal axis of reciprocation of the trough and wherein all of the pins are in parallelism with said axis.

3. In a dispenser as set forth in claim 1 wherein said structure includes a casting having means attaching the same to the trough, a spring-loaded rod attached to the casting, and a crosshead mounted on the rod, the uppermost and lowermost pins being mounted on the crosshead and extending toward the casting, the median pin being mounted on the casting and extending toward the crosshead.

4. In a dispenser as set forth in claim 3 wherein the tube is disposed between the crosshead and the casting whereby the median pin is inserted into the tube and the remaining pins are retracted from the tube as the trough moves toward the tube.

(References on following page)

References Cited in the file of this patent

UNITED STATES PATENTS

| | | |
|---|---|---|
| 559,534 | Lohsand | May 5, 1896 |
| 712,962 | Price | Nov. 4, 1902 |
| 1,711,021 | Hoopes | Apr. 30, 1929 |
| 1,711,685 | Krcma | May 7, 1929 |
| 1,742,350 | Hatch | Jan. 7, 1930 |
| 2,136,089 | Stone | Nov. 8, 1938 |
| 2,159,905 | Moninger | May 23, 1939 |
| 2,304,484 | Smith | Dec. 8, 1942 |
| 2,348,449 | Chandler | May 9, 1944 |
| 2,433,619 | Monroe | Dec. 30, 1947 |
| 2,552,856 | Knapp | May 15, 1951 |